2,938,000

Patented May 24, 1960

2,938,000

OLEFIN POLYMERIZATION CATALYSTS

Graham George Wanless, Westfield, and Charles W. Seelbach, Cranford, N.J., assignors to Esso Research and Engineering Company, a corporation of Delaware No Drawing. Filed Oct. 29, 1956, Ser. No. 618,713

4 Claims. (Cl. 252—429)

The present invention relates to polymerization catalysts, methods of preparing such catalysts, and the polymers formed therewith. More particularly, the invention concerns catalysts used to polymerize olefins at relatively low pressures.

High molecular weight polyolefins, such as polyethylene, have been commercially prepared by using high pressures, e.g., 500 to 3000 atmospheres, a temperature between 100 and 400° C. and a trace of oxygen or an organic peroxide as the catalyst. In recent years it has been shown that these substances can be polymerized at relatively low pressures in a liquid reaction medium by employing a combination of reducing metals or metal compounds, e.g., alkali and alkaline earth metals, aluminum compounds, etc., and reducible metal compounds, such as halides, acetyl, acetonates, etc. of the metal in groups IV to VI and VIII of the periodic table, e.g., titanium, zirconium, iron, etc. The catalyst is the reaction product of these two components. The best known catalyst of this type is a combination of trialkyl aluminum or dialkyl aluminum halide with titanium tetrahalide. Very satisfactory polymers have been obtained by using combinations of triethyl aluminum or diethyl aluminum chloride with titanium tetrachloride, obtained by simply mixing the catalyst components at room temperature.

It has now been discovered that the reducible metal compound may be reacted with a reducing substance which not only serves to support the metal, but also enhances its catalytic activity. Furthermore, it has been found that under certain conditions this new catalyst forms a polymer having outstanding physical properties.

One embodiment of the present invention is that a titanium halide is formed which is violet in color, yet does not appear to have a crystalline structure by X-ray analysis. It is well known in the art that titanium trichloride may exist in several forms. If it is produced by reacting titanium tetrachloride with hydrogen in the presence of an electric discharge, it is a brown amorphous substance. This brown form may be converted to a violet-colored crystalline substance by heating it at an elevated temperature, e.g., about 200° C. At very high temperatures, e.g. 400 to 470° C., it may form a mixture of $TiCl_2$ and $TiCl_4$. The catalyst of the present invention is unique because it behaves in many ways like the violet form, yet by X-ray analysis it apparently is not crystalline.

According to the present invention catalysts having extremely high efficiencies are produced by intimately contacting a reducible heavy metal compound preferably in a liquid medium, with a silicon-containing support which at least partially reduces the aforementioned metal compound and produces a highly active substance having a large surface area. The large surface area is the result of the silicon-containing support which has an area in the range between 50 to 300 sq. meters/gram. The support-heavy metal compound product is then combined with another metal compound, such as an organometallic compound, and used to polymerize olefins.

In general, the silicon compound is the major proportion of the catalyst intermediate, but proportions of, say about 25 to 99 wt. percent of silicon compound and about 1 to 75 wt. percent of reduced heavy metal compound may be employed. Catalyst intermediates comprising between about 50 to 98 wt. percent of the silicon compound and about 2 to 50 wt. percent heavy metal compound are preferred, and an amount between 70 and 98 wt. percent of silicon compound is especially preferred for the polymerization of lower olefins, such as ethylene and propylene.

According to one embodiment of this invention titanium tetrachloride is reacted with a silicon oxyhydride having a formula $SiHO_{3/2}$. It is believed that the following reaction occurs where a sufficient amount of hydride is used to reduce the tetrachloride to the trichloride:

$TiCl_4 + SiHO_{3/2} \rightarrow SiO_2 \cdot TiCl_3 + HCl$.

The oxyhydride supports used in this invention may be prepared by hydrolysis. For instance, trichlorosilane may be hydrolyzed at a temperature between about 0 and 37° C. to form silicon oxyhydride. The solid product may be filtered, washed and dried at about 125° C. in a stream of air. The purity of the silicon oxyhydride may vary between about 90 and 100%, preferably between about 95 and 100%, the principal impurity being silicon tetrachloride. A typical analysis of silicon oxyhydride is 50.0% silica, 1.76% hydrogen by combustion and 0.33% chloride. It generally has an average particle size between about 0.1 and 0.5 micron, a surface area between about 50 and 300 sq. meters/g., preferably between about 150 and 250 sq. meters/g., and an apparent density between about 0.072 and 0.152 g./cc.

The catalyst may be prepared by intimately mixing 1 mol of the heavy metal compound, e.g titanium tetrachloride, with about 0.5 to 200 mols of the silicon-containing support, e.g. silicon oxyhydride, and an organic liquid, e.g. dry normal heptane, in a bomb reactor having an inert atmosphere, e.g. dry nitrogen. The bomb is heated to 100 to 500° C. and maintained there with agitation for from a few hours up to about 30 hours, preferably for between about 3 to 5 hours. At the end of this time the bomb is brought to atmospheric pressure while maintaining its temperature between 100 and 500° C. The product is recovered as a solid, and where titanium tetrachloride is used, the product has a violet color. An alternate procedure involves reacting the reducible compound with the support by mixing the two reactants in the absence of an organic liquid. For instance, $TiCl_4$ is a liquid and may therefore be the reaction medium as well as the reactant.

The product obtained by combining the heavy metal compound with the oxyhydride is activated by intimately mixing it with an aluminum compound, such as an organo aluminum compound, preferably in a diluent and a nonoxidizing atmosphere. About 10 to 99.5 wt. percent, and preferably about 50 to 98 wt. percent, of heavy metal-oxyhydride product is combined with about 0.5 to 90 wt. percent, and preferably 2 to 50 wt. percent, of an activating compound, such as aluminum trialkyl. An especially preferred embodiment is where 70 to 95 wt. percent of heavy metal-oxyhydride product is combined with about 5 to 30 wt. percent of activating compounds. The reaction is usually carried out for between about 10 minutes up to 4 hours at between about −20 and 100° C., however it is preferred to use temperatures between about 20 and 40° C. The molar ratio of the metal in the organo-metallic compound to reduced metal, for instance Al/Ti, should be between about 0.1 and 20, and preferably between about 1 and 4. In some cases, it may be desirable to grind the solid reduction product or otherwise comminute it before reacting it with the organo-metallic compound. The catalyst slurry recovered may be then either used directly to polymerize olefins or it may be further treated to remove part or all of the organic liquid present. An alternate method of carrying out the reaction between the reducible heavy metal compound and the silicon compound involves mixing the two components in an inert atmosphere without a liquid diluent. For instance, ball-milling them in an atmosphere of helium until the heavy metal compound has been sufficiently reduced and activating the product with an aluminum compound.

Organo-metallic compounds which have been found to be outstanding for the purposes of this invention include: tri n-octyl aluminum, tri-isobutyl aluminum, tri-propyl aluminum, triethyl aluminum, diethyl aluminum halide, etc. Other compounds having somewhat lower reducing activity include: dimethyl aluminum halides, trimethyl aluminum, methyl and ethyl aluminum dihalides, higher alkyl aluminum halides and trialkyl aluminum compounds having alkyl groups higher than about $C_{10}$. Mixtures of aluminum alkyls may also be employed to reduce the heavy metal component of the catalyst, for instance, a mixture of ethyl aluminum dichloride and diethyl aluminum chloride. Other useful combinations include ethyl aluminum dichloride and triethyl aluminum; diethyl aluminum chloride and triethyl aluminum. In addition to trialkyl or aryl aluminum compounds, organo-aluminum compounds with two hydrocarbon radicals, or at least one hydrocarbon radical and one hydrogen, as well as an electron attracting group, such as an alkoxy, halogen, organic nitrogen, sulfur, etc. may be used.

Other suitable materials, that may be used to activate the heavy metal-support component, include alkali and alkaline earth metals, their alloys, hydrides and alkyl and/or aryl derivatives, as well as the alkyl and aryl derivatives of other metals which have sufficient stability to react with the reducible heavy metal compound.

Reducible heavy metal compounds suitable for the purposes of this invention include inorganic halides, oxyhalides, complex halides, oxides, hydroxides, and organic compounds, such as alcoholates, acetates, benzoates and acetyl acetonates of the transition metals of groups IV, V, VI and VIII in the periodic table, e.g. titanium, zirconium, hafnium, thorium, uranium, vanadium, niobium, tantalum, chromium, molybdenum, tungsten and manganese, as well as iron and cobalt. The metal halides, and particularly the chlorides, are preferred, titanium and zirconium chlorides being the most active. Titanium tetrabromide, titanium tetrachloride and zirconium acetylacetonate are the most readily reducible, while ferrous chloride, chromic chloride and manganese chloride are more difficult to reduce.

The reaction medium may be a gas or liquid, and preferably a saturated hydrocarbon such as normal heptane. The liquid or gas should be of a high purity to avoid any possible poisoning of the catalyst. Suitable inert gases which may be used alone or in combination with a liquid hydrocarbon are nitrogen, helium, argon, etc.

The polymerization process employing the catalysts prepared in accordance with the invention is carried out for between about a few minutes up to about 20 hours, and preferably for about 1 hour to 4 hours, under conditions normally used heretofore in the low pressure polymerization of olefins to prepare high molecular weight polymers suitable as "plastics" and for similar purposes. These conditions depend somewhat on the specific olefin involved and on the type of polymer desired. Ethylene and propylene are the preferred olefins although higher olefins, such as butylenes, styrene, hexadecene, butadiene, etc. may be used alone or in mixtures. Normal olefins are preferred, especially alpha olefins having 2 to 5 carbon atoms. The polymers produced have molecular weights above about 2000 and may range as high as from 300,000 to 3,000,000 or more as determined by the intrinsic viscosity method using the I. Harris correlation (J. Polymer Science 1, 361, 1952). In the case of ethylene, the polymerization is carried out by intimately contacting gaseous ethylene with the catalyst of the invention, for example, by bubbling the ethylene into a suspension of the catalyst in an inert solvent or diluent. Neither the polymerization temperature nor the polymerization pressure is particularly critical, although when the monomer is ethylene, propylene or butene, pressures ranging from atmospheric up to about 1000 p.s.i.g. or more should be used, preferably between about 200 and 500 p.s.i.g. Generally it is preferred to operate at temperatures of about 0° to 150° C., especially those between about 25° and 90° C.

Pressures ranging anywhere from atmospheric, or subatmospheric, to about 250 atmospheres have been used heretofore in the low pressure polymerization of ethylene and other olefins on catalysts of the type improved by the present invention. Similar pressures may be used in this invention.

The polymerization reaction is preferably carried out under exclusion of oxygen, or moisture, or other harmful impurities, while stirring in batch or continuous operation. When operating batchwise, olefin introduction is continued until the reaction ceases. In order to permit stirring even after the formation of substantial amounts of solid polymer, additional solvents or diluents may be used. These diluents, which should be liquid at the operating conditions, include aliphatic, hydroaromatic and aromatic hydrocarbons, such as pentane, hexane, higher paraffins, cyclohexane, tetrahydronaphthalene, decahydronaphthalene, benzene, xylene, halogenated aromatic hydrocarbons, e.g. mono- or dichlorobenzenes and mixtures thereof. The polymer concentration in the reaction mixture may be between about 5 to 40 wt. percent.

The amount of total catalyst used may vary within wide limits depending somewhat on the purity of the olefin feed. Proportions of as little as 0.1 part by weight of total catalyst per 1,000 parts by weight of olefin are sufficient if the feed is pure. With olefin feed streams containing about 0.01% of water, oxygen, carbon dioxide or certain other oxygenated compounds, catalyst proportions of about 0.5 to 5 wt. percent on the same basis are usually adequate. If desired the olefin feed may be purified with activated alumina before contacting it with the catalyst.

Upon completion of the polymerization reaction, the catalyst may be completely deactivated by the addition of an alcohol, such as isopropyl alcohol or n-butyl alcohol, in amounts of about 10 to 100 times the amount of catalyst used. The reaction slurry may then be filtered, the filter cake reslurried in a catalyst solvent, such as dry, concentrated alcohol, which may contain a chelate, at about 50° to 100° C. for 15 to 60 minutes, filtered again, washed with acetone and the filter cake dried, preferably under reduced pressure. The amount of ash in the polymer will vary according to the quantity of catalyst employed, but is generally between about 0.01 and 2.5 wt. percent. The silica in the polymer tends to improve the properties of the product.

In practicing the present invention a reducible heavy metal compound, such as titanium tetrachloride, is reacted with an oxyhydride which serves to at least partially reduce the heavy metal as well as act as a support for it. The reaction generally takes between 1 to 30 hours at a temperature preferably between about 200 and 400° C., under a pressure between about 1 atmosphere and about 20 atmospheres of inert gas. The mol ratio of the components (support/heavy metal compound) is preferably between about 1 and 50; an especially desirable ratio is between about 1 and 10. It is generally desirable to have an inert organic liquid, such as n-heptane, present to assist the reaction by acting as a carrier. Next the reaction product obtained is reacted with an activating compound, such as an aluminum trialkyl, for from a few minutes up to about 4 hours, and preferably for about 1 hour, at a temperature between about −20 and 100° C., under atmospheric pressure or moderate pressure up to about 50 p.s.i.g. The mol ratio of the metal in the activating component to supported metal component, e.g. aluminum/titanium, is generally between about 0.1 and 20. If desired a small quantity of one of the olefins to be polymerized with the catalyst may be added during this step. The catalyst recovered is highly active and produces polymers, especially ethylene and propylene polymers, having extraordinary properties.

The polymers produced by the present invention are at least equal in quality and, in many cases, superior to those produced by conventional low pressure polymerization processes.

This and other more specific aspects of the invention will be best understood by reference to the following specific examples.

EXAMPLE 1

10 ml. (17.2 grams) of titanium tetrachloride and 14.5 grams of a silicon oxyhydride ($SiHO_{3/2}$) which had an average particle size between 0.1 and 0.5 micron were placed in a chrome-vanadium steel Aminco bomb and 75 ml. of dry n-heptane was added. The reaction was carried out for 16 hours at 300° C. in an atmosphere of dry nitrogen. At the end of the reaction period the bomb was vented to atmospheric pressure while maintaining the temperature at 300° C. The recovered product was a violet powder of $TiCl_3$ on a silica-silicon oxyhydride support which did not have a crystalline structure by X-ray analysis.

EXAMPLE 2

Six tenths of a gram of the product obtained in Example 1 was combined with 4.5 ml. of a 0.88 molar aluminum triethyl for one hour at room temperature and atmospheric pressure in the presence of dry n-heptane. A highly active polymerization catalyst was recovered.

EXAMPLE 3

The catalyst recovered above was placed in a 3000 ml. chrominum-vanadium steel Aminco bomb, and used to polymerize 100 grams of propylene, which was added as a cold liquid. Sixteen and one-half grams of solid polypropylene was recovered after 20 hours at 80° C. and 600–700 p.s.i.g. of dry nitrogen.

EXAMPLE 4

Several catalyst intermediates were prepared by reacting 14.5 grams of silicon oxyhydride with 3, 10 and 30 ml. (5.16, 17.26 and 51.6 grams) respectively, of titanium tetrachloride under nitrogen. The reactions were carried out at temperatures ranging between 300 and 317° C. for 64 hours. All had a violet color and a non-crystalline structure by X-ray analysis.

EXAMPLE 5

Catalyst intermediates, prepared by reacting equal weights of $SiHO_{3/2}$ and $TiCl_4$, were combined with aluminum triethyl and allowed to stand for one hour at 25° C. before the propylene was introduced. The catalyst concentrations, based on the amount of aluminum triethyl and $TiCl_3$, were 18 grams/liter of n-heptane in run #1 and 17 grams/liter of n-heptane in run #2. The polypropylene was recovered by slurrying the reaction mixture in an excess of isopropyl alcohol, filtering, reslurrying in isopropyl alcohol containing a small amount of acetyl acetone, boiling for about 15 minutes, cooling and filtering. The solid was then washed with acetone and dried under vacuum at about 70° C. The polymerization conditions and polymer properties are set forth in Table I.

Table I

|  | Run #1 | Run #2 |
|---|---|---|
| Polymerization conditions: |  |  |
| Al/Ti mol ratio | 2 | 4 |
| Temperature, ° C | 80 | 80 |
| Pressure, p.s.i.g | 500 | 540 |
| Time, hours | 16 | 16 |
| Total grams of catalyst [1] | 0.53 | 0.50 |
| n-Heptane, grams | 21 | 21 |
| Propylene, grams | 100 | 100 |
| Polymer properties: Molecular weight×$10^{-3}$, Harris | 264 | 320 |

[1] Includes $SiHO_{3/2}$ support.

EXAMPLE 6

Another group of polymerizations was undertaken wherein the catalyst was prepared by combining various quantities of aluminum triethyl with an intermediate comprising 1 part by weight of $TiCl_3$ and 1 part $SiHO_{3/2}$ made by reacting 1 part of $SiHO_{3/2}$ with 1 part of $TiCl_4$ at 300° C. for 16 hours, according to the procedure set forth in Example 4.

The polymerization conditions and polymer properties are set forth in Table II.

Table II

|  | Run #3 | Run #4 | Run #5 | Run #6 |
|---|---|---|---|---|
| Polymerization conditions: |  |  |  |  |
| Aluminum triethyl, parts | 0.65 | 1.3 | 2 | 4 |
| Titanium trichloride, parts | 1 | 1 | 1 | 1 |
| Silicon oxyhydride, parts | 1 | 1 | 1 | 1 |
| Total weight of catalyst, grams | 0.83 | 1.05 | 0.43 | 0.65 |
| Wt. of Al triethyl and $TiCl_3$, grams | 0.68 | 0.90 | 0.38 | 0.60 |
| Al/Ti, mol ratio | 0.65 | 1.3 | 2 | 4 |
| Temperature, ° C | 80 | 80 | 80 | 80 |
| Max. pressure, p.s.i.g | 400 | 460 | 700 | 770 |
| Time, hours | 16 | 16 | 16 | 16 |
| n-Heptane, grams | 21 | 21 | 21 | 21 |
| Propylene, grams | 100 | 100 | 100 | 100 |
| Polymer properties: Molecular weight×$10^{-3}$, Harris | 145 | 320 | 323 | 200 |

The data show that high molecular weight polymers are obtained when the catalyst's Al/Ti mol ratio is between 1 and 4.

EXAMPLE 7

Another series of experiments were carried out to determine the effect of using a catalyst intermediate prepared by reacting 3 and 10 parts by weight, respectively, of $SiHO_{3/2}$ with 1 part by weight of $TiCl_4$ at 300° C. for 16 hours. The polymerization conditions and polymer properties were as follows:

Table III

|  | Run #7 | Run #8 | Run #9 | Run #10 | Run #11 | Run #12 | Run #13 |
|---|---|---|---|---|---|---|---|
| Polymerization conditions: |  |  |  |  |  |  |  |
| Aluminum triethyl, parts | 2.7 | 4 | 4 | 13 | 6.5 | 4 | 2 |
| Titanium trichloride, parts | 1 | 1 | 1 | 1 | 1 | 1 | 1 |
| Silicon oxyhydride, parts | 3 | 3 | 3 | 10 | 10 | 10 | 10 |
| Total weight of catalyst, grams | 0.85 | 1.05 | 2.10 | 1.05 | 0.83 | 0.74 | 1.34 |
| Weight of Al triethyl and $TiCl_3$, grams | 0.65 | 0.75 | 1.50 | 0.51 | 0.29 | 0.20 | 0.26 |
| Al/Ti, mol ratio | 2.7 | 4 | 4 | 13 | 6.5 | 4 | 2 |
| Temperature, ° C | 80 | 80 | 80 | 80 | 80 | 80 | 80 |
| Max. pressure, p.s.i.g | 800 | 770 | 630 | 540 | 320 | 500 | 500 |
| Time, hours | 16 | 16 | 16 | 16 | 16 | 16 | 16 |
| n-Heptane | 65 | 21 | 21 | 21 | 21 | 21 | 21 |
| Propylene, grams | 300 | 100 | 100 | 100 | 100 | 100 | 100 |
| Polymer properties: |  |  |  |  |  |  |  |
| Molecular weight×$10^{-3}$, Harris | 330 | 255 | 215 | 197 | 348 | 424 | 387 |
| Percent insoluble in n-heptane | 69 | 71 | 75 |  |  |  |  |

The data show that outstanding polymers may be prepared with catalysts comprising a combination of silicon oxyhydrides, titanium halides, and aluminum alkyl compounds. The ratios of silicon to titanium and aluminum to titanium may be varied over a wide range.

EXAMPLE 8

Titanium trichloride-silicon oxyhydride catalyst intermediates were combined with aluminum triethyl and allowed to stand for 1 hour in a n-heptane diluent. The catalyst concentration in run #14 was 18 grams/liter of diluent and in run #15 it was 17 grams/liter of diluent. The polymerization conditions and polymer properties are set forth in Table IV:

*Table IV*

|  | Run #14 | Run #15 |
|---|---|---|
| Polymerization conditions: |  |  |
| Total catalyst, grams |  | 0.7 |
| Al/Ti, mol ratio | 2.0 | 4.0 |
| Temperature, °C | 80 | 80 |
| Pressure, p.s.i.g | 400 | 680 |
| n-Heptane | 21 | 21 |
| Propylene, grams | 100 | 100 |
| Polymer properties: |  |  |
| Softening-melting point, °C | 160–72 | 163–68 |
| Tensile strength, p.s.i. | 3,230 | 2,910 |
| Elongation, percent | 150 | 230 |

The data show that polymers prepared with catalysts made according to the present invention have very desirable properties. These highly crystalline, strong plastic substances are extremely versatile and may be used in many different ways.

The catalysts prepared according to the present invention may be used not only to prepare homopolymers, but also copolymers and tripolymers, as well. The relative proportions of the materials used in the examples and reaction conditions may be varied within the limits indicated in the specification to obtain products of varying characteristics.

What is claimed is:

1. A catalyst consisting essentially of the reaction product of about 1 to 75 wt. percent of a reducible, transition, heavy metal halide selected from the group consisting of halides of groups IV–B, V–B and VI–B metals of the periodic system and about 25 to 99 wt. percent of silicon oxyhydride and an activating alkyl aluminum compound.

2. A catalyst according to claim 1 in which the reducible heavy metal is a titanium halide.

3. A catalyst consisting essentially of about 0.5 to 90 wt. percent of an activating alkyl aluminum compound and about 10 to 99.5 wt. percent of a reaction product comprising about 1 to 75 wt. percent of a reduced, heavy, transition, metal halide of group IV–B to group VI–B metals of the periodic table and about 25 to 99 wt. percent of silicon oxyhydride.

4. A catalyst consisting essentially of about 1 to 75 wt. percent of an at least partially reduced, heavy, transition, metal halide of group IV–B to group VI–B metals of the periodic table supported and reduced by about 25 to 99 wt. percent of silicon oxyhydride and an alkyl aluminum compound, the mol ratio of aluminum to the heavy metal being between about 0.1 to 20.

References Cited in the file of this patent

UNITED STATES PATENTS

| | | |
|---|---|---|
| 2,478,390 | Hanford et al. | Aug. 9, 1949 |
| 2,692,868 | Berry et al. | Oct. 26, 1954 |
| 2,705,206 | Wagner | Mar. 29, 1955 |
| 2,721,189 | Anderson et al. | Oct. 18, 1955 |
| 2,726,231 | Field et al. | Dec. 6, 1955 |
| 2,824,089 | Peters et al. | Feb. 18, 1958 |